United States Patent [19]
Poisel et al.

[11] Patent Number: 5,281,807
[45] Date of Patent: Jan. 25, 1994

[54] OPTICAL SENSOR HEAD WITH SLOPED, CONVERGENT OPTICAL SYSTEMS AND BEAM DIAPHRAGM

[75] Inventors: Hans Poisel, Röthenbach; Norbert Rothkirch; Gert Trommer, both of München, all of Fed. Rep. of Germany

[73] Assignee: Deutsche Aerospace AG, Fed. Rep. of Germany

[21] Appl. No.: 12,656

[22] Filed: Feb. 3, 1993

[30] Foreign Application Priority Data

Feb. 29, 1992 [DE] Fed. Rep. of Germany ....... 4206357

[51] Int. Cl.⁵ .......................... H01J 3/14; H01J 5/16; G01J 1/20
[52] U.S. Cl. ........................... 250/216; 250/206.2; 250/227.28; 385/115
[58] Field of Search ............. 250/216, 227.11, 227.28, 250/227.29, 221, 206.1, 206.2; 356/141, 152; 385/89, 91, 115, 120

[56] References Cited

U.S. PATENT DOCUMENTS

| | | | |
|---|---|---|---|
| 4,666,309 | 5/1987 | Barry et al. | 250/227.29 |
| 4,758,065 | 7/1988 | Dorman et al. | 250/227.28 |
| 4,778,990 | 10/1988 | Laughlin | 250/227.28 |
| 4,900,914 | 2/1990 | Raff et al. | 250/227.28 |
| 4,914,284 | 4/1990 | Halldorsson et al. | 250/227.29 |
| 5,023,440 | 6/1991 | Kuppenheimer, Jr. | 250/216 |
| 5,075,797 | 12/1991 | Jones | 250/216 |
| 5,196,689 | 3/1993 | Sugita et al. | 250/221 |

FOREIGN PATENT DOCUMENTS

3736616 2/1989 Fed. Rep. of Germany.

Primary Examiner—Michael Messinger
Attorney, Agent, or Firm—Evenson, McKeown, Edwards & Lenahan

[57] ABSTRACT

An optical sensor head for the directional tecting of optical radiation has an arrangement of individual optical systems that are differently sloped with their optical axes, are convergently aligned in the viewing direction and each have conical, partially overlapping viewing areas. To provide an exact bounding of the observation sector assigned to the sensor head without any impairment of the operatability, at least one outer-edge-side individual optical system of the sensor head is provided with a beam diaphragm which partially shades the assigned viewing cone. At least one of the neighboring optical systems, which is situated closer to a sensor center, is arranged with its light entrance opening approximately at the level of the diaphragm-bounded edge beams of the outer-edge-side individual optical system.

10 Claims, 2 Drawing Sheets

OPTICAL SENSOR HEAD WITH SLOPED, CONVERGENT OPTICAL SYSTEMS AND BEAM DIAPHRAGM

BACKGROUND AND SUMMARY OF THE INVENTION

The present invention relates to an optical sensor head for the directional detecting of optical radiation, having an arrangement of individual optical systems which are differently sloped with their optical axes, are convergently aligned in the viewing direction and each have conical partially overlapping viewing areas.

Known sensor heads of this type (German Patent Document DE 37 36 616 C1), whose optical axes are aligned to be convergent with an intersecting point which is situated in front of the light entrance openings of the individual optical systems, have considerable constructive advantages in comparison to those sensor heads with a rearwardly converging axis geometry. This is mainly because they permit a flat construction of the sensor head and an extremely close positioning of the light entrance openings on the forward sensor head surfaces. These sensor head however are unsuitable for applications in which a precise bounding of the observation field of the sensor head to a defined angular area is required. This is the case, for example, when for a circumferential observation, several sensor heads are provided which are each aligned with different observation sectors. It must not only be ensured that each observation sector is controlled without gaps only by the sensor head assigned to it but that any overlapping at the sector boundaries, which make a clear determination of the direction of the optical radiation which is incident in this area difficult or impossible, must be avoided.

It is an object of the invention to provide a sensor head of the above-described type so that, while a simple method of construction and operation is maintained, a precise bounding of a given angular area is ensured.

This and other objects are achieved by the present invention which provides an optical sensor head for directional detecting of optical radiation, comprising an arrangement of individual optical systems that have optical axes that are differently sloped, are convergently aligned in a viewing direction and have conical partially overlapping viewing areas. The individual optical systems include at least one outer-edge-side individual optical system and at least one neighboring optical system situated closer to a sensor center and having a light entrance opening. A beam diaphragm partially shades the viewing cone of the outer-edge-side individual optical system to create a diaphragm-bounded edge beam of the outer-edge-side individual optical system. The neighboring optical system is arranged with its light entrance opening approximately at the level of the diaphragm-bounded edge beams of the outer-edge-side individual optical system.

The present invention is based on the recognition that an angularly precise bounding of the observation range of the sensor head cannot be achieved merely by partial shading of the individual optical systems on the exterior edge. Rather, with surprisingly low constructional expenditures, the precise bounding is achieved by a combination of such a shading with the raising of the individual optical systems situated farther on the inside, without any disturbing effect on the operability of the sensor head in the thus limited observation sector. The sensor head according to the invention is especially well-suited for the above-described application in which, for ensuring a clear angle detection of the received optical radiation, any disturbing overlapping across boundaries between adjacent observation sectors, which are each controlled by a sensor head, must be prevented.

In a particularly preferred embodiment of the invention, the optical axis of the neighboring optical system(s) which is situated farther toward the inside, taking into account the viewing cone opening angle, is sloped in such a manner that the lower edge beams of the viewing cone, without any diaphragm bounding extend essentially at the same slope as the edge beams of the individual optical system on the side of the outer edge of the sensor head which are bounded by the diaphragm. Thus, the viewing range of the neighboring optical system(s), because of the arrangement of the diaphragm, is essentially maintained in an unlimited manner.

In certain embodiments that are particularly advantageous with respect to installation, the beam diaphragm is preferably arranged outside the sensor head surface occupied by the individual optical systems so that it can be accommodated on the sensor head without any problems and without interfering with the narrow mutual positioning of the light entrance openings on the forward sensor head surface.

For continuous covering of the observation sector with as few individual optical systems as possible which are uniformly distributed with their viewing cones, in certain embodiments the viewing cone of the outer-edge-side individual optical system is shaded by means of the diaphragm arrangement up to the optical axis.

For a protection against interfering reflexes and/or beam scattering, the beam diaphragm in certain embodiments expediently has a reflection-reducing surface structure. To this end, certain embodiments have a saw-tooth structure and/or a radiation-absorbing surface coating.

In certain embodiments, an axis geometry which constructionally and operationally is particularly preferred for the monitoring of the diaphragm-bounded observation sector has the optical axes of the individual optical systems centrically aligned with the center axis of the sensor head.

In certain embodiments of the invention, the individual optical systems are connected via optical fibers with an optoelectrical converter which feeds the directional receiving signals to an electronic analyzing circuit for angle detection.

In certain embodiments, the diaphragm-bounded viewing area of the sensor head extends along a spatial angle of 90° so that an azimuthal full-circle observation can be achieved by means of four sensor heads which bound on one another without overlapping.

Other objects, advantages and novel features of the present invention will become apparent from the following detailed description of the invention when considered in conjunction with the accompanying drawings.

DETAILED DESCRIPTION OF THE DRAWINGS

Figure 1:
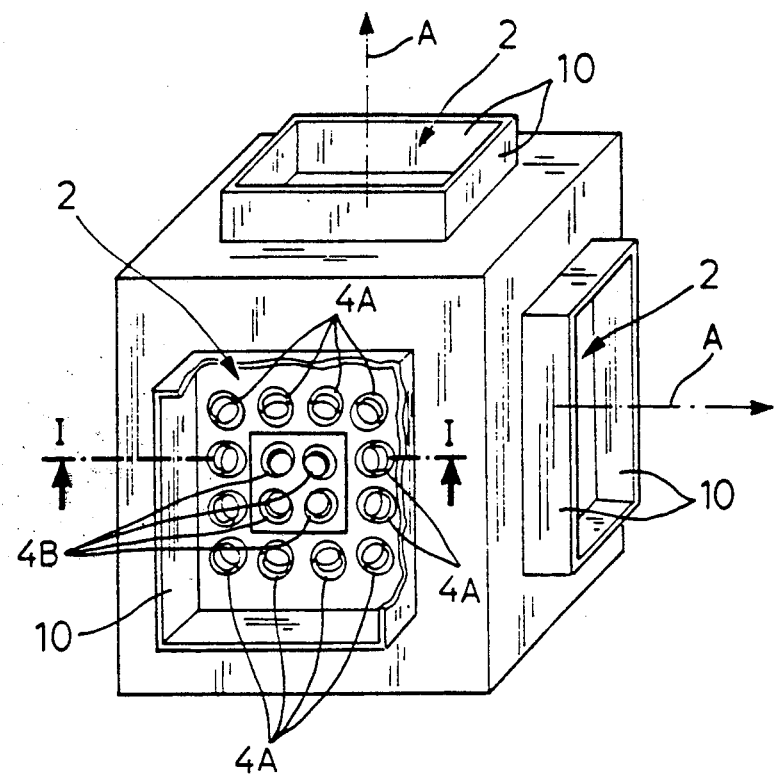
FIG. 1 is a schematic perspective representation of a laser warning device, constructed in accordance with an embodiment of the present invention, comprising several diaphragm-bounded sensors heads.
Figure 2:
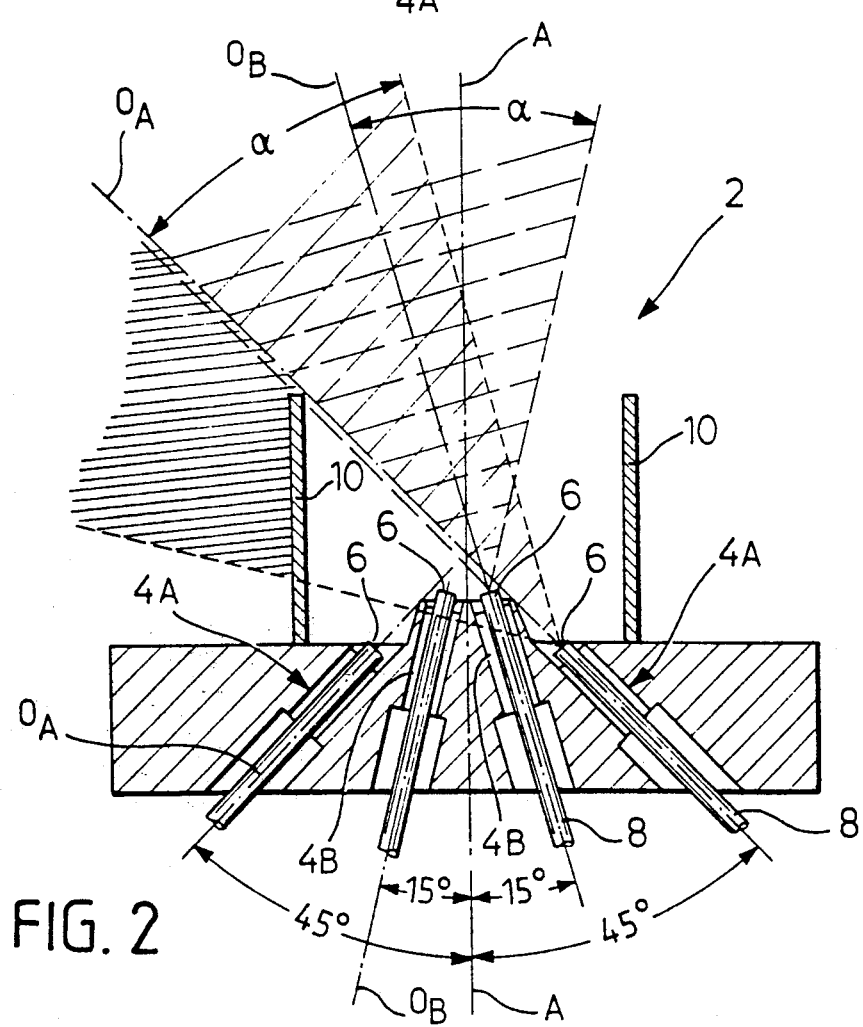
FIG. 2 is a sectional view of one of the sensor heads according to FIG. 1 along Line I-I.

The laser warning device illustrated in several optical sensor heads 2 to which one observation sector respectively of several adjacent observation sectors is assigned. Each sensor head 2 comprises a plurality of individual optical systems 4 which are arranged symmetrically with respect to a central sensor head axis A. By means of their optical axes 0, the individual optical systems 4 are centrically aligned with respect to the sensor head axis A and converge in the viewing direction. Each individual optical system 4 has a viewing area which expands from the light entrance opening 6 at an opening angle α corresponding to the numerical aperture. The optical axes 0, while taking into account the opening angle α, are sloped in such a manner that the individual viewing cones partially overlap inside the observation sector assigned to the sensor head 2 and cover the observation sector without gaps. In the illustrated embodiment, the viewing cone opening angle amounts to α=30°, and the outer-edge-side individual optical systems 4A are sloped by 45° with respect to the sensor head axis A in the sectional plane shown in FIG. 2. The neighboring optical systems 4B that are situated closer to the sensor head center are each sloped by 15°.

A laser beam detected by an optical system 4 is transmitted via an assigned optical fiber 8 to an optoelectrical converter 11 and is converted there into an analog or digital signal which changes with respect to the optical axis O in correspondence to the angle of incidence, this analog or digital signal being fed to an analyzing circuit (not shown) for the angle detection.

For reasons of a clear angle determination, any disturbing overlapping of views between the observation sectors of adjacent sensor heads 2 must be prevented. With the orthogonal alignment of the sensor head axes A, this means that each observation sector extends toward the adjacent sensor heads 2 via an angle area of 45° with respect to the sensor head axis A. (This is true for the sectional plane of FIG. 2 as well as perpendicularly with respect to it, to cover a spatial sector of a total of 90°). For the angularly precise bounding of the observation sectors, beam diaphragms 10 are provided on the sensor head 2 outside the sensor head field occupied by the individual optical systems 4. These beam diaphragms 10 shade the viewing cones of the outer-edge-side individual optical systems 4A, which are sloped at 45°, in each case up to the level of their optical axis $O_A$. In addition, the individual optical systems 4B which are adjacent in the direction of the sensor head center and are sloped at 15°, are with their light entrance openings 6. raised to the level of the diaphragm-bounded edge beams of the outer optical systems 4A. The individual optical systems 4B are thus arranged at the level of the optical axes $O_A$ in such a manner that their viewing cones, shown by an interrupted line in FIG. 2, remain essentially without diaphragm shading and therefore extend with their lower edge beams conformally with respect to the 45°-sector boundary area. In this manner, it is ensured that the observation sector of the sensor head 2 without any impairment of the operatability is limited to the given angle area with high precision.

Figure 3:
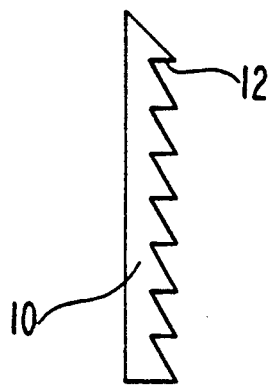
FIG. 3 illustrates an embodiment of a beam diaphragm used in the present invention.

As illustrated in FIG. 3, in order to avoid disturbing scattered-light and reflection effects, certain embodiments of the beam diaphragms 10 have a reflection-reducing, e.g., saw-tooth-shaped surface structure and/or are coated with a radiation absorbing surface coating 12, such as a dull paint coating.

The described sector bounding can also be used in optical systems with other axis slopes and viewing cone opening angles and for differently selected observation angles. Thus, it is possible, for example, to limit the observation sector only in the direction of the sectional plane illustrated in FIG. 2 by means of a diaphragm arrangement 10, but to leave it unbounded perpendicularly with respect to it.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An optical sensor head for directional detecting of optical radiation, comprising
   an arrangement of individual optical systems that have optical axes that are differently sloped, are convergently aligned in a viewing direction and have conical partially overlapping viewing areas, the individual optical systems including at least one outer-edge-side individual optical system and at least one neighboring optical system situated closer to a sensor center and having a light entrance opening; and
   a beam diaphragm which partially shades the viewing cone of the outer-edge-side individual optical system to create a diaphragm-bounded edge beam of the outer-edge-side individual optical system, wherein the neighboring optical system is arranged with its light entrance opening approximately at the level of the diaphragm-bounded edge beam of the outer-edge-side individual optical system and wherein the optical axis of the neighboring optical system is sloped such that lower viewing cone edge beams of the neighboring optical system substantially extend, without any diaphragm bounding, with the same slope as the diaphragm-bounded edge beams of the outer-edge-side optical system.

2. A sensor head according to claim 1, further comprising a sensor head surface occupied by the individual optical systems, wherein the beam diaphragm is situated outside the sensor head surface.

3. A sensor head according to claim 1, wherein the viewing cone of the outer-edge-side individual optical system is shaded by the beam diaphragm up to the level of the optical axis of the outer-edge-side individual optical system.

4. A sensor head according to claim 1, wherein the beam diaphragm has at least one of a reflection-reducing surface structure and a reflection-reducing surface quality.

5. A sensor head according to claim 4, wherein the beam diaphragm has a saw-tooth shaped surface structure.

6. A sensor head according to claim 5, wherein the beam diaphragm has a radiation absorbing surface coating.

7. A sensor head according to claim 1, wherein the optical axes of the individual optical systems are centrically aligned with respect to the center axis of the sensor head.

8. A sensor head according to claim 1, wherein the individual optical systems are connected via optical fibers to an opto-electric converter.

9. A sensor head according to claim 1, wherein a diaphragm-bounded overall viewing area of the sensor head extends over an angle of approximately 90°.

10. A sensor head according to claim 5, wherein the beam diaphragm has a radiation absorbing surface coating.

* * * * *